US007756198B2

(12) United States Patent
Chen et al.

(10) Patent No.: US 7,756,198 B2
(45) Date of Patent: Jul. 13, 2010

(54) SYSTEM AND METHOD FOR ASSIGNING CHANNELS IN A WIRELESS NETWORK

(75) Inventors: Wei-Peng Chen, Santa Clara, CA (US);
Chenxi Zhu, Gaithersburg, MD (US);
Takeo Hamada, Cupertino, CA (US);
Jonathan R. Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 873 days.

(21) Appl. No.: 11/549,892

(22) Filed: Oct. 16, 2006

(65) Prior Publication Data
US 2008/0043668 A1 Feb. 21, 2008

Related U.S. Application Data

(60) Provisional application No. 60/822,861, filed on Aug. 18, 2006.

(51) Int. Cl.
*H04Q 1/20* (2006.01)
(52) U.S. Cl. .................................................. 375/225
(58) Field of Classification Search ................. 375/219, 375/220, 225, 240, 316; 370/395.21, 395.41, 370/468, 235, 329; 455/452.2, 177.1, 200.1, 455/266
See application file for complete search history.

(56) References Cited

U.S. PATENT DOCUMENTS

| 4,736,453 | A | 4/1988 | Schloemer ..................... 455/33 |
| 6,219,541 | B1 | 4/2001 | Brodie ........................ 455/451 |
| 6,718,158 | B1 | 4/2004 | Suonvieri ....................... 455/9 |
| 7,346,689 | B1* | 3/2008 | Northcutt et al. ............ 709/227 |
| 2003/0095512 | A1 | 5/2003 | Hepsaydir .................... 370/320 |
| 2004/0121749 | A1* | 6/2004 | Cui et al. ................. 455/226.1 |
| 2004/0203814 | A1 | 10/2004 | Ho et al. ..................... 455/450 |
| 2004/0242158 | A1 | 12/2004 | Fattouch et al. ............ 455/63.1 |
| 2005/0014464 | A1 | 1/2005 | Larsson ..................... 455/11.1 |

(Continued)

FOREIGN PATENT DOCUMENTS

KR            2004-83040         10/2004

OTHER PUBLICATIONS

*Industrial Technology Research Institute*, 802.16j MMR Mobile Multi-Hop Relay, tmlin@tri.org.tw (21 pages), Jun. 1, 2006.

(Continued)

*Primary Examiner*—Sam K Ahn
(74) *Attorney, Agent, or Firm*—Baker Botts L.L.P.

(57) ABSTRACT

A method for assigning channels in a wireless network includes receiving from each of a plurality of a first type of wireless components a total average data rate. Each total average data rate is based on an average data rate for each of a first plurality of a second type of wireless components coupled to the respective first type of wireless component. The method also includes determining at least one channel parameter for a first wireless component of the plurality of the first type of wireless components based on a ratio of the total average data rate associated with the respective first wireless component to the total average data rate associated with the plurality of the first type of wireless components. The method further includes allocating a channel to the first wireless component based on the determined at least one channel parameter.

31 Claims, 2 Drawing Sheets

U.S. PATENT DOCUMENTS

| | | | | |
|---|---|---|---|---|
| 2005/0085235 | A1* | 4/2005 | Park et al. | 455/450 |
| 2005/0250499 | A1 | 11/2005 | Lee et al. | 455/437 |
| 2006/0030309 | A1 | 2/2006 | Lee et al. | 455/422.1 |
| 2006/0045094 | A1 | 3/2006 | Yun et al. | 370/395.4 |
| 2006/0068823 | A1 | 3/2006 | Kwon et al. | 455/517 |
| 2006/0121903 | A1 | 6/2006 | Lee et al. | 455/439 |
| 2006/0193280 | A1 | 8/2006 | Lee et al. | 370/315 |
| 2007/0037576 | A1 | 2/2007 | Subramanian et al. | 455/436 |
| 2007/0047569 | A1 | 3/2007 | Das et al. | 370/443 |
| 2007/0066241 | A1 | 3/2007 | Hart | 455/69 |
| 2007/0086379 | A1* | 4/2007 | Takayanagi et al. | 370/329 |
| 2007/0160020 | A1 | 7/2007 | Osann | 370/338 |
| 2007/0249347 | A1 | 10/2007 | Saifullah et al. | 455/436 |
| 2007/0270118 | A1 | 11/2007 | Subramanian et al. | 455/343.2 |
| 2008/0009243 | A1 | 1/2008 | Hart | 455/67.13 |
| 2008/0031197 | A1 | 2/2008 | Wang et al. | 370/331 |
| 2008/0045139 | A1 | 2/2008 | Chen et al. | 455/3.04 |
| 2008/0045215 | A1 | 2/2008 | Chen et al. | 455/435.2 |

OTHER PUBLICATIONS

Letter from Paul Nikolich to Jodi Haasz at International Stds Programs and Governance re *P802.16j—Amendment to IEEE Standard for Local and Metropolitan Area Networks*—Part 16: Air Interface for Fixed and Mobile Broadband Wireless Access Systems—Multihop Relay Specification (4 pages), Mar. 31, 2006

Puthenkulam, et al., 802.16e: A Mobile Broadband Wireless Standard, *Mobility Group*, Copyright © 2005 Intel Corporation (29 pages), 2005.

IEEE 802 Tutorial: 802.16 Mobile Multihop Relay, *IEEE Wireless-MAN 802.16*, (73 pages), Mar. 6, 2006.

IEEE Standard for Local and Metropolitan area networks, Part 16: Air Interface for Fixed and Mobile Broadband Wireless Access Systems, Amendment 2, and Corrigendum 1 *IEEE* Copyright © IEEE. (822 pages), 2006.

U.S. Patent communication mailed Sep. 10, 2008 re U.S. Appl. No. 11/627,759, filed Jan. 26, 2007, Sep. 10, 2008.

U.S. Patent communication mailed Jan. 9, 2009 re U.S. Appl. No. 11/627,759, filed Jan. 26, 2007, Jan. 9, 2009.

U.S. Patent communication mailed Sep. 29, 2009 re U.S. Appl. No. 11/557,428, filed Nov. 7, 2006, Sep. 29, 2009.

Kipo's Notice of Preliminary Rejection (English translation) mailed Feb. 18, 2009 in re Korean Patent Application 10-2007-77445 (4 pages), Feb. 18, 2009.

Kipo's Notice of Preliminary Rejection (English Translation) Office Action for Korean Patent Application No. 10-2007-78631, 4 pages, received Feb. 20, 2009, Feb. 20, 2009.

Wei-Peng Chen et al., U.S. Appl. No. 11/557,428, filed Nov. 7, 2006, Communication from the United States Patent and Trademark Office dated Apr. 17, 2009, Apr. 17, 2009.

Kipo's Notice of Preliminary Rejection (English Translation) Office Action for Korean Patent Application No. 10-2007-78631, received Aug. 24, 2009, referencing KR Pat. Appln. Pub. 2004-83040, Aug. 24, 2009.

Jain, et al., *Impact of Interference on Multi-hop Wireless Network Performance*, MobiCom '03, Sep. 14-19, 2003, San Diego, CA (14 pages), Sep. 14, 2003.

IEEE 802.16 Presentation Submission Template (Rev. 8.3), downloaded from http://grouper.ieee.org/groups/802/16/relay/contrib/C80216j-06_004rl.pdf (14 pages), May 8, 2006.

Chen, U.S. Appl. No. 11/557,428, Communication from the Patent and Trademark Office mailed Nov. 16, 2009.

* cited by examiner

SYSTEM AND METHOD FOR ASSIGNING CHANNELS IN A WIRELESS NETWORK

RELATED APPLICATIONS

This application claims priority to U.S. patent application Ser. No. 60/822861, entitled "MANAGING A WIRELESS NETWORK," which was filed on Aug. 18, 2006.

TECHNICAL FIELD OF THE INVENTION

This invention relates in general to communication systems and, more particularly, to a system and method for assigning channels in a wireless network.

BACKGROUND OF THE INVENTION

While broadband network services and Voice over IP (VoIP) products continue to grow and expand, so does the demand for wireless network functionality. To help meet this demand networks are being developed that use multiple base stations, relay stations, access points or points of contact. One emerging technology is 802.16, popularly known as WiMAX. WiMAX provides broadband wireless access, with a single base station providing coverage over a large area (theoretically up to 31 miles). Other wireless networking technologies include Third Generation (3G), Third Generation Partnership Project (3GPP), and 802.11, popularly known as WiFi.

An endpoint's ability to enjoy the benefits of wireless networks, such as WiMAX, depends on its ability to locate and lock onto a strong enough signal. This can often be difficult in areas where the signal from the base station encounters interference (e.g., at the edge of its range, in areas where the coverage of two bases stations overlap, within a tunnel or building). One possible solution is to increase the transmission power of the base station; another solution is to install additional base stations. However, this may not be desirable because of the increased operating costs and the limited access to backhaul links. Another solution is 802.16j which is being developed by the 802.16j Relay Working Group as part of the 802.16 standard. 802.16j provides a way to implement relay stations that may increase the service area and/or throughput abilities of a WiMAX base station. The relay stations do not need a backhaul link because they communicate wirelessly with both base stations and endpoints. This type of network may be referred to as a multihop network because there may be more than one wireless connection between the endpoint and a hardwired connection.

As may be apparent, communicating wirelessly with both base stations and endpoints increases the amount of data that the relay station must communicate. More specifically, the relay station both receives and then transmits the same data between the endpoint and the base station using wireless connections. A relay station within the wireless network may often only use a single channel to provide its communication needs with both the endpoints and the other relay stations and base stations. The capacity of this channel is finite and in some situations may be insufficient to support the traffic demands within a particular relay station's cell.

SUMMARY

Particular embodiments provide a system and method for assigning channels in a wireless network that substantially eliminates or reduces at least some of the disadvantages and problems associated with previous methods and systems.

In accordance with a particular embodiment, a method for assigning channels in a wireless network includes receiving from each of a plurality of a first type of wireless components a total average data rate. Each total average data rate is based on an average data rate for each of a first plurality of a second type of wireless components coupled to the respective first type of wireless component. The method also includes determining at least one channel parameter for a first wireless component of the plurality of the first type of wireless components based on a ratio of the total average data rate associated with the respective first wireless component to the total average data rate associated with the plurality of the first type of wireless components. The method further includes allocating a channel to the first wireless component based on the determined at least one channel parameter.

In some embodiments the first type of wireless component may be a relay station and the second type of wireless component may be an endpoint. Furthermore, in some embodiments the first type of wireless component and the second type of wireless component may use 802.16 Worldwide Interoperability for Microwave Access (WiMAX). In particular embodiments, the at least one channel parameter may include a center frequency or a channel size.

In particular embodiments of the method determining at least one channel parameter for the first wireless component of the plurality of the first type of wireless components may include determining at least one channel parameter for each radio of a plurality of radios associated with the first wireless component.

In accordance with another embodiment, a method for assigning channels in a wireless network may include receiving a plurality of bandwidth requests from a plurality of wireless components. The method may also include storing the plurality of bandwidth requests and storing the amount of data received between each bandwidth request of the plurality of bandwidth requests from each respective wireless component. The method may also include periodically calculating an average data rate associated with each respective wireless component. The average data rate may be based on at least two prior bandwidth requests received from the respective wireless component and the amount of data received from the respective wireless component between the at least two prior bandwidth requests.

In some embodiments, the method may further include, upon calculating the average data rate associated with each respective wireless component, sending the average data rate associated with each respective wireless component to a controller associated with a base station. The method may also further include receiving at least one channel parameter. The at least one channel parameter may be determined by the controller associated with the base station and used to communicate data with the base station.

In particular embodiments the method may further include combining the average data rate associated with each respective wireless component into a total average data rate. Furthermore, sending the average data rate associated with each respective wireless component to the controller associated with the base station may include sending the total average data rate to the controller associated with the base station.

In some embodiments the method may further include, upon receiving a first bandwidth request from a first wireless component of the plurality of wireless components, allocating to the first wireless component a wireless connection having a bandwidth based on a previously calculated average data rate associated with the first wireless component.

Where the method includes periodically calculating the average data rate associated with each respective wireless component the method may comprise periodically calculating the average data rate associated with each respective wireless component using $$r_i(t) = \begin{cases} din_i(t)/T_{r_i} & t = 0 \\ (1 - \alpha_{avg}) \cdot r_i(t-1) + \alpha_{avg} \cdot din_i(t)/(T_{r_i}^{t+1} - T_{r_i}^{t}) & t > 0 \end{cases}$$

where $din_i(t)=req_i(t+1)-req_i(t)+dout_i(t)$, $req_i(t+1)$ and $req_i(t)$ are bandwidth requests, $dout_i(t)$ is the amount of data sent between bandwidth requests, $T_{r_i}$ is an allocation period and $\alpha_{avg}$ is a system parameter representing the weight of at least one statistic.

In accordance with another embodiment a system for assigning channels in a wireless network includes an interface operable to receive from each of a plurality of a first type of wireless components a total average data rate. Each total average data rate is based on an average data rate for each of a first plurality of a second type of wireless components coupled to the respective first type of wireless component. The system also includes a processor coupled to the interface and operable to determine at least one channel parameter for a first wireless component of the plurality of the first type of wireless components based on a ratio of the total average data rate associated with the respective first wireless component to the total average data rate associated with the plurality of the first type of wireless components. The processor is further operable to allocate a channel to the first wireless component based on the determined at least one channel parameter.

In accordance with another embodiment a system for assigning channels in a wireless network includes an interface operable to receive a plurality of bandwidth requests from a plurality of wireless components. The system also includes a processor coupled to the interface and operable to store the plurality of bandwidth requests. The processor is also operable to store the amount of data received between each bandwidth request of the plurality of bandwidth requests from each respective wireless component. Furthermore, the processor is operable to periodically calculate an average data rate associated with each respective wireless component, the average data rate based on at least two prior bandwidth requests received from the respective wireless component and the amount of data received from the respective wireless component between the at least two prior bandwidth requests.

Technical advantages of particular embodiments include allocating endpoints with bandwidth based on an average data rate. Accordingly, bandwidth is allocated based on information representing a statistically longer period of time as opposed to wireless networks that grant bandwidth based solely on the most recent bandwidth request. Another advantage of particular embodiments includes periodically sending the average data rate to a controller for channel allocation. Accordingly, the amount of traffic sent between base stations and relay stations is reduced compared to wireless networks in which relay stations or base stations simply forward each bandwidth request they receive.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
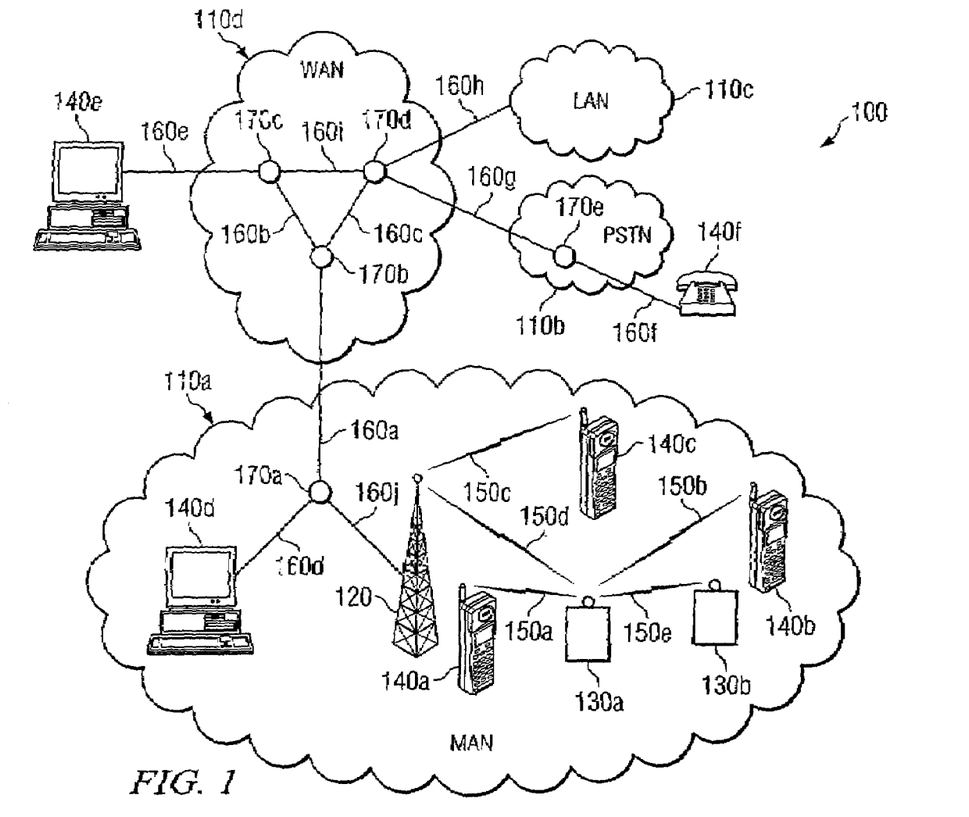
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network, popularly known as WiMAX, which may include base stations (e.g., base station 120) and relay stations (e.g., relay stations 130). Network 110a may provide for the use of relay stations 130 by implementing 802.16j. A WiMAX network that uses relay stations may be referred to as a mobile multihop relay (MMR) network. In particular embodiments, relay stations 130 may comprise multiple radios that may each have a different channel associated therewith. Each radio may be capable of establishing several wireless connections 150 with other base stations, relay stations and/or endpoints using different subchannels. In some embodiments, a relay station, such as relay station 130a, may use one radio to establish a wireless connection 150d for transmitting/receiving data to/from base station 120, and a second radio to establish wireless connections 150a, 150b, and 150e with endpoints 140a, 140b and relay station 130b, respectively.

Because a wireless network may comprise multiple radios there may arise a need to determine how to assign channels among the various radios of the different relay stations, base stations, and endpoints to allow them to transfer data efficiently and with as little interference as possible. In assigning channels it may be desirable to take into account traffic demands and interference that may be caused by other channels. It may also be desirable to determine a center frequency and a channel bandwidth. Some embodiments may use a two step approach in assigning channels to particular radios. The first step may involve a centralized controller allocating suitably sized channels to each radio. The second step may involve each base station and/or relay station assigning subchannels and/or slots to each wireless connection, whether with an endpoint, another base station, or relay station.

Some embodiments may use the average data rate of a particular wireless connection and/or of a plurality of wireless connections in determining the size/bandwidth of a channel or subchannel. The average data rate may be calculated periodically. Because the average data rate is used in assigning channels and subchannels and because it is calculated periodically, there may be a reduction both in the overhead associated with allocating bandwidth to an endpoint each time the endpoint needs to send data and in the amount of data that is communicated between a base station or relay station and a central controller. Furthermore, it should be noted that because devices with multiple radios may be used, thus multiple channels, it may be desirable to allocate channels both in the frequency domain and the time domain, as opposed to simply in the time domain as is done in many single channel WiMAX networks.

Although communication system 100 includes four networks 110a-110d, the term "network" should be interpreted as generally defining any network capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wireline networking.

Generally, networks 110a, 110c, and 110d provide for the communication of packets, cells, frames, or other portions of information (generally referred to as packets herein) between endpoints 140 and/or nodes 170. Networks 110 may include any number and combination of wired links 160, wireless connections 150, nodes 170 and/or endpoints 140. For purposes of illustration and simplicity, network 110a may be a MAN implemented, at least in part, via WiMAX, network 110b may be a PSTN, network 110c may be a LAN, and network 110d may be a WAN.

Networks 110a, 110c and 110d may be IP networks. IP networks transmit data by placing the data in packets and sending each packet individually to the selected destination, along one or more communication paths. Network 110b is a PSTN that may include switching stations, central offices, mobile telephone switching offices, pager switching offices, remote terminals, and other related telecommunications equipment that are located throughout the world. Network 110d may be coupled to network 110b through a gateway. In some embodiments the gateway may be a part of network 110b or 110d (e.g., nodes 170e or 170c may comprise a gateway). The gateway may allow PSTN 110d to be able to communicate with non-PSTN networks such as networks 110a, 110c and 110d.

Any of networks 110a, 110c and/or 110d may be coupled to other IP networks including, but not limited to, the Internet. Because IP networks share a common method of transmitting data, signals may be transmitted between devices located on different, but interconnected, IP networks. In addition to being coupled to other IP networks, any of networks 110a, 110c and/or 110d may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections, and nodes 170 connect various networks but they also interconnect endpoints 140 with one another and with any other components coupled to or a part of networks 110. The interconnection of networks 110a-110d may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d.

Wireless connections 150 may represent a wireless connection between two components using, for example, WiMAX. The extended range of a WiMAX base station and/or relay station may allow network 110a to cover the larger geographic area associated with a MAN while using a relatively small number of wired links. More specifically, by properly arranging base station 120 and multiple relay stations 130 around a metropolitan area, the multiple relay stations 130 may use wireless connections 150 to communicate with base station 120 and wireless endpoints 140 throughout the metropolitan area. Then base station 120 may, through wired connection 160a, communicate with other base stations, network components not capable of establishing a wireless connection, and/or with other networks outside of the MAN, such as network 110d or the Internet.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170a may comprise another base station that is wired to base station 120 via link 160j and to network 110d via link 160a. As a base station, node 170a may be able to establish several wireless connections with various other base stations, relay stations, and/or endpoints. As another example, node 170e may comprise a gateway. This may allow may allow network 110b, a PSTN network, to be able to transmit and receive communications from other non-PSTN networks, such as network 110d, an IP network. Node 170e, as a gateway, works to translate communications between the various protocols used by different networks.

Endpoints 140 and/or nodes 170 may comprise any combination of hardware, software, and/or encoded logic that provides data or network services to a user. For example, endpoints 140a-140c may include an IP telephone, a computer, a video monitor, a camera, a personal data assistant, a cell phone or any other hardware, software and/or encoded logic that supports the communication of packets (or frames) using networks 110. Endpoints 140 may also include unattended or automated systems, gateways, other intermediate components or other devices that can send or receive data and/or signals. Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
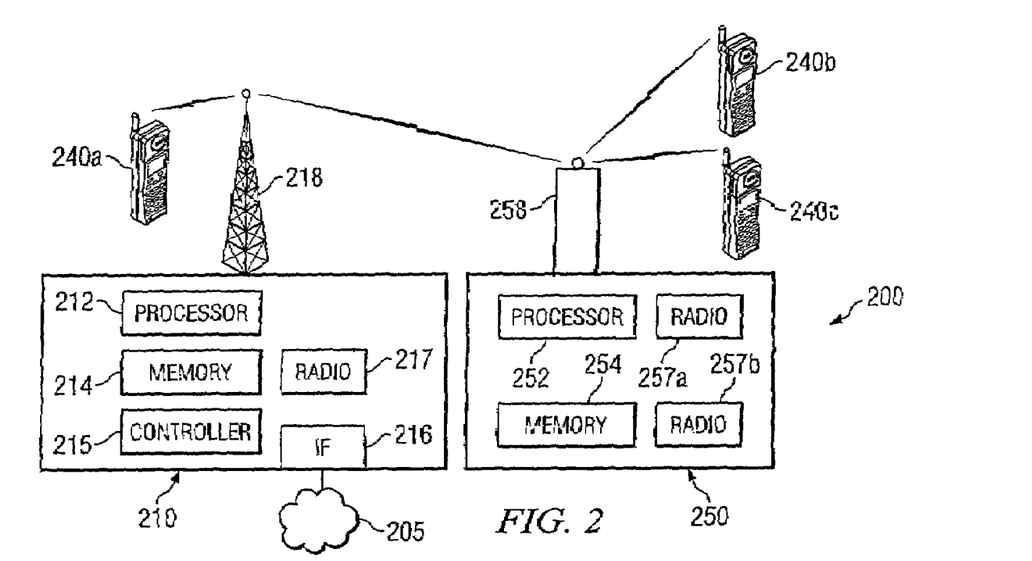
FIG. 2 illustrates a wireless network comprising a more detailed view of a base station and a relay station, in accordance with a particular embodiment.

FIG. 2 illustrates a wireless network 200 comprising a more detailed view of base station 210 and relay station 250, in accordance with a particular embodiment. In different embodiments network 200 may comprise any number of wired or wireless networks, base stations, endpoints, relay stations, and/or any other components that may facilitate or participate in the communication of data and/or signals whether via wired or wireless connections. For simplicity, network 200 comprises network 205, base station 210, endpoints 240 and relay station 250. Base station 210 comprises processor 212, memory module 214, controller 215, interface 216, radio 217 and antenna 218. Similarly, relay station 250 comprises processor 252, memory module 254, radio 257 and antenna 258. These components may work together in order to provide base station and/or relay station functionality, such as assigning channels and/or subchannels in a wireless network (e.g., a WiMAX wireless network). Network 205 may comprise one or more of the networks described above with respect to FIG. 1.

Processor 212 may be a microprocessor, controller, or any other suitable computing device, resource, or combination of hardware, software and/or encoded logic operable to provide, either alone or in conjunction with other base station 210 components, such as memory module 214 and/or controller 215, base station 210 functionality. Such functionality may include providing various wireless features discussed herein to an endpoint or relay station, such as endpoint 240a or relay station 250. Processor 212 may be used in periodically calculating the average data rate for endpoints coupled directly to base station 210 (e.g., endpoint 240a). Processor 212 may also be used by or in combination with controller 215 in allocating channels. In some embodiments, processor 212 may be used in determining how to divide a channel assigned to base station 210 into subchannels that can be used for wireless connections with endpoint 240a and relay station 250.

Memory module 214 may be any form of volatile or non-volatile memory including, without limitation, magnetic media, optical media, random access memory (RAM), read-only memory (ROM), removable media, or any other suitable local or remote memory component. Memory module 214 may store any suitable data or information, including software and encoded logic, utilized by base station 210. In some embodiments memory module 214 may store various bandwidth requests and/or average data rates received from endpoints 240 and/or relay station 250. Memory module 214 may also maintain a list, database, or other organization of data useful for determining how to route data to the proper endpoints and/or relay stations. For example, in some embodiments a tree structure (as opposed to a mesh structure) may be used in routing data from an endpoint to a base station. More specifically, there may be a known path from base station 210 to endpoint 240b. This path, or a portion thereof, may be stored in memory module 214.

Base station 210 also comprises controller 215. Controller 215 may provide centralized channel assignments for network 200. Depending on the embodiment, controller 215 may be located within base station 210; may be part of network 205; may be part of another base station; or may be part of any other component that has a wired connection to base station 210. In some embodiments, controller 215 may allocate channels to base station 210 and relay station 250 by using the total average data rates received from base station 210 and/or relay station 250. The total average data rate for a specific relay station or base station may represent the combination of the average data rates for each endpoint connected to the base station or relay station. For example, the total average data rate sent by relay station 250 may include the sum of the average data rates for endpoints 240b and 240c. Controller 215 may allocate to each base station and relay station a channel having sufficient size to supply suitable bandwidth to each wireless connection associated with the respective base station or relay station. In particular embodiments the channel size may be 1.25 MHz, 5 MHz, 10 MHz, 20 MHz, or 40 MHz. Furthermore, in some embodiments a relay station or base station may comprise more than one radio (e.g., radios 257a and 257b of relay station 250), in which case controller 215 may assign a channel to each of the radios of a particular relay station or base station. For example, radio 257a may be an endpoint style radio used to communicate with base station 210 and radio 257b may be a base station type radio used to communicate with endpoints 240b and 240c. In this example controller 215 may assign one channel to radio 257a and one channel to 257b, thus allowing relay station 250 to receive data from endpoint 240a while transmitting data to base station 210 without having to worry about interference from transmitting and receiving using the same channel. After determining how to allocate various channels among the various radios, base stations and/or relay stations, controller 215 may send the information to the respective radios, base stations, and/or relay stations.

Controller 215 may also receive channel allocation information from other remote controllers connected to other base stations, relay stations, or networks. This may allow adjacent wireless networks to avoid assigning channels which will create interference. Similarly, controller 215 may transmit its own channel allocations to other controllers so that they may avoid allocating channels that may cause interference with those devices controlled by controller 215.

Interface 216 may be used in the wired communication of signaling and/or data between base station 210 and network 205. For example, interface 216 may perform any formatting or translating that may be needed to allow base station 210 to send and receive data from network 205 over a wired connection.

Radio 217 may be coupled to or a part of antenna 218. Radio 217 may receive digital data that is to be sent out to other base stations, relay stations and/or endpoints via a wireless connection. Radio 217 may convert the digital data into a radio signal having the appropriate channel and bandwidth parameters. These parameters may have been determined ahead of time by some combination of processor 212, controller 215 and/or memory module 214. The radio signal may then be transmitted via antenna 218 to the appropriate recipient (e.g., relay station 250).

Antenna 218 may be any type of antenna capable of transmitting and receiving data and/or signals wirelessly. In some embodiments, antenna 218 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Relay station 250 comprises components similar to those of base station 210. One exception may be that relay station 250 does not include an interface for a wired connection. This may be because relay station 250 may only use wireless connections, and thus does not need a wired connection. By allowing relay station 250 to be deployed without a wired connection, the initial deployment cost may be lower because network wires do not have to be run out to each relay station. Relay station 250 also does not include the functionality (and any additional components that may be associated therewith) of controller 215. This may be because relay station 250 may not be responsible for allocating channels to other relay stations or base stations.

Processor 252 may be a microprocessor, controller, or any other suitable computing device, resource, or combination of hardware, software and/or encoded logic operable to provide, either alone or in combination with other relay station 250 components, such as memory module 254, relay station 250 functionality. Such functionality may include providing various wireless features discussed herein to an endpoint or base station, such as endpoint 240b, 240c or base station 210. Processor 252 may be used in periodically calculating the average data rate for endpoints coupled to relay station 250 (e.g., endpoints 240b and 240c). In some embodiments, processor 252 may be used in determining how to divide a channel assigned to relay station 250 into subchannels that can be used for wireless connections with endpoints 240b, 240c and base station 210.

Memory module 254 may be any form of volatile or non-volatile memory including, without limitation, magnetic media, optical media, random access memory (RAM), read-only memory (ROM), removable media, or any other suitable local or remote memory component. Memory module 254 may store any suitable data or information, including software and encoded logic, utilized by relay station 250. In some embodiments memory module 254 may store previous bandwidth requests, the amount of data sent by an endpoint between bandwidth requests, and/or previously calculated average data rates for endpoints 240. Memory module 254 may also maintain a list, database, or other organization of data useful for determining how to route data to the proper endpoints, base stations and/or relay stations.

Radios 257 may be coupled to or a part of antenna 258. Radios 257 may receive digital data from, for example, processor 252 that is to be sent out to other base stations, relay stations and/or endpoints via a wireless connection. Each radio 257 may have its own channel which they may use after converting the digital data into a radio signal having the appropriate channel, frequency, and bandwidth parameters. These parameters may have been determined ahead of time by some combination of processor 212, controller 215 and/or memory module 214 of base station 210. The radio signal from each radio may then be transmitted via antenna 258 to the appropriate recipient (e.g., base station 210). For example, after processor 252 periodically calculates the average data rate for endpoints 240 it may combine the average data rate for each of endpoints 240b and 240c into a total average data rate which is to be sent to controller 215 of base station 210. Because the total average data rate is only sent periodically, after processor 252 has determined the total average data rate, the amount of wireless data that is sent between relay station 250 and base station 210 may be less than in a system that relays each bandwidth request from an endpoint to the base station.

Not only may the two radios of relay station 250 be assigned different channels as discussed above, but they may be different types of radios. More specifically, radio 257a may be an endpoint style radio used to communicate with base station 210, and radio 257b may be a base station style radio used to communicate with endpoints 240b and 240c. Thus from the perspective of endpoints 240 relay station 250 may appear to be a base station, and from the perspective of base station 210 relay station 250 may appear to be an endpoint. This may allow a wireless network to incorporate a relay station without having to change the way endpoints transmit or receive data.

Antenna 258 may be any type of antenna capable of transmitting and receiving data and/or signals wirelessly. In some embodiments, antenna 258 may comprise one or more omni-directional, sector or panel antennas operable to transmit/receive radio signals between 2 GHz and 66 GHz.

Endpoints 240 may be any type of wireless endpoints able to send and receive data and/or signals to and from base station 210 or relay station 250. Some possible types of endpoints 240 may include desktop computers, PDAs, cell phones, laptops, and/or VoIP phones.

To better understand how the various components of base station 210 and relay station 250 work to provide wireless functionality, the components of the illustrated embodiment will be discussed in the context of an example. Endpoints 240b and 240c may have established a connection with relay station 250. Whenever they need to send data they may first send a bandwidth request to base station 250. In response to a bandwidth request from, for example, endpoint 240c, base station 250 may grant endpoint 240c bandwidth based on a previously calculated average data rate for endpoint 240c.

The average data rate may reflect multiple past bandwidth requests as well as the amount of data that has been sent/received to/from endpoint 240c during a particular allocation period. This information may be stored in memory module 254 to be processed by processor 252 to determine the average data rate. Processor 252 may calculate the average data rate for both data sent and received from an endpoint. More specifically, processor 252 may use the formula $$r_i(t) = \begin{cases} din_i(t)/T_{r_i} & t = 0 \\ (1 - \alpha_{avg}) \cdot r_i(t-1) + \alpha_{avg} \cdot din_i(t)/(T_{r_i}^{t+1} - T_{r_i}^t) & t > 0 \end{cases} \quad (1)$$

to determine the average data rate for data sent from relay station 250 to endpoint 240c where $din_i(t)$ is the amount of data sent via wireless connection i (e.g., the wireless connection between relay station 250 and endpoint 240c) during the $t^{th}$ evaluation period $T_{r_i}$, and $\alpha_{avg}$ is a constant value between 0 and 1 (e.g., $\alpha_{avg}=0.5$). The value of $\alpha_{avg}$ may be determined based on how fast the system would like to react to changes in the data rate. Similarly, the average data rate for data sent from endpoint 240c to relay station 250 may use the same formula as above except that $din_i(t)=req_i(t+1)-req_i(t)+dout_i(t)$ where $req_i(t)$ is the size of a bandwidth request from endpoint 240c and $dout_i(t)$ is the amount of data that has been received since the last bandwidth request.

It may be that in some situations base station 210, relay station 250 and endpoint 240b may transmit/receive data using different burst profiles. A burst profile may indicate the manner and efficiency with which data may be sent. In some embodiments processor 252 may take into account the difference in burst profiles between the wireless connection with base station 210 and the wireless connection with endpoint 240b when determining the average data rate. Different burst profiles may comprise different modulation or coding rates which may impact the efficiency with which data is transferred. When relay station 250 receives a bandwidth request from endpoint 240b having a certain burst profile, processor 252 may increase or decrease the size of the bandwidth request before calculating the average data rate. To properly adjust the bandwidth request processor 252 may use the following equation: (2) $BR_f=BR_{ep}*M_a/M_r$, where $BR_f$ is the adjusted bandwidth request, $BR_{ep}$ is the bandwidth request received from endpoint 240b, and $M_a/M_r$ is a ratio representing the modulation and coding rate of an access link (e.g., between endpoint 240b and relay station 250) to the modulation and coding rate of a relay link (e.g., between relay station 250 and base station 210).

The average data rate is calculated on a periodic basis. The length of the period may be referred to as the allocation period. Thus, when endpoint 240c sends a bandwidth request during a particular allocation period, base station 250 responds by providing endpoint 240c with bandwidth based on the average data rate calculated during a previous allocation period, such as the immediately preceding allocation period. During each allocation period, not only does processor 252 calculate the average data for each endpoint connected to relay station 250, it also combines each of the average data rates that it determined during the allocation period and sends the total average data rate to base station 210 where controller 215 may use the information in assigning channels.

It should be noted that because the average data rate is calculated on a periodic basis, the channel allocations may similarly be adjusted on a periodic basis. This may reduce the number of times that channels are re-allocated, thus reducing any overhead associated with re-allocating the channels. This may also allow the bandwidth allocations to be based on data covering a longer period of time as well as the amount of data that was actually sent rather than just the most recently received bandwidth request. Furthermore, this may also reduce the number of communications sent from relay station 250 to base station 210. More specifically, because relay station 250 is transmitting the total average data rate to base station 210 on a periodic basis the number of bandwidth related messages may be less than in a wireless system in which the relay station sends the base station each bandwidth request it receives. Furthermore, because the average data rate is based on information already provided by an endpoint, there is no need to alter the way an endpoint sends data. More specifically, whether the endpoint is in a network that calculates the average data rate or not, the endpoint will send the same request for bandwidth before sending data.

The average data rate for each wireless connection may be calculated at relay station 250, base station 210 or controller 215. Whether the average data rate is calculated by relay station 250 or base station 210, the average data rate for each wireless connection associated with a particular base station or relay station may be combined into a total average data rate for that respective base station or relay station before it is sent to controller 215. For example, base station 210 may send controller 215 the total average data rate for the wireless connections associated with endpoint 240a and relay station 250. In particular embodiments, base station 210 and/or relay station 250 may send controller 215 the individual average data rates without combining them into a total average data rate.

Using the information provided by base station 210 and relay station 250, as well as any information received from any adjacent controllers, controller 215 may assign channels to base station 210 and relay station 250. The channels may comprise sufficient bandwidth so that each endpoint connected to the base station or relay station may be given enough bandwidth to cover their respective average data rate. In some embodiments the channel size may be 1.25 MHz, 5 MHz, 10 MHz, 20 MHz, or 40 MHz.

In determining the size of a channel for a particular radio, such as radios 217, 257a, or 257b, controller 215 may use the following formula:

$$C(R'') = B \cdot \frac{\sum_{e \in E_{R''}} \sum_{i \in CID_e} r_i / m_e}{\max_R \sum_{R' \in I_R} \sum_{e' \in E_{R'}} \frac{\sum_{i \in CID_{e'}} r_i}{m_{e'}}} \quad (3)$$

where C(R") is the size of the channel assigned to a particular radio R", B is the bandwidth of the overall spectrum (e.g., 70 MHz), the numerator represents the traffic demand of radio R" (e.g., the traffic between base station 210 and relay station 250 and endpoint 240a, or between relay station 250 and endpoints 240b and 240c), and the denominator represents the total traffic demands of each of the radios within network 205. The above calculation may result in a real number that is not one of the predetermined channels sizes (e.g., 1.25 MHz, 5 MHz, 10 MHz, 20 MHz, or 40 MHz). This may require controller 215 to then associate the appropriate channel size (e.g., 1.25 MHz, 5 MHz, 10 MHz, 20 MHz, or 40 MHz) with the result of the above equation. In some embodiments this may involve rounding the solution to the above equation to the smallest nearest feasible value. In particular embodiments, associating the appropriate channel size may involve limiting the above equation with the following constraints $$C(R) = (1.25 \cdot C^1(R) + 5 \cdot C^2(R) + 10 \cdot C^3(R) + 20 \cdot C^4(R)) \quad (4)$$

$$C^1(R) + C^2(R) + C^3(R) + C^4(R) = 1$$

$$\forall R \in \mathbb{R}$$

$$C^i(R) = \{0 \text{ or } 1\}$$

$$\forall i = \{1, 2, 3, 4\}$$

Upon determining a suitable channel size for each radio, controller 215 may pass the channel information to memory module 214 and/or radio 217. More specifically, the channel information may be sent to memory module 214 so that memory module 214 may store the channel information for later retrieval by processor 212 and/or radio 217 to configure radio 217; and the channel information may be sent to radio 217 so that radio 217 may send the channel information, via antenna 218, to the other radios within network 205 (e.g., radios 257) so that they may configure themselves.

Furthermore, once base station 210 and relay station 250 have received the channel information, each may use their respective processors to assign subchannels to the individual wireless connections. More specifically, base station 210 may assign a relatively small subchannel for data transmissions with endpoint 240a and a relatively large subchannel for data transmissions with relay station 250.

Thus far several different embodiments and features have been presented. Particular embodiments may combine one or more of these features depending on operational needs and/or component limitations. This may allow for great adaptability of network 200 to the needs of various organizations and users. For example, a particular embodiment may use several base stations to provide wireless access for a metropolitan area, or a single base station may be used with several relay stations providing the necessary coverage. Furthermore, in some embodiments relay station 250 may have more or less radios.

Figure 3:
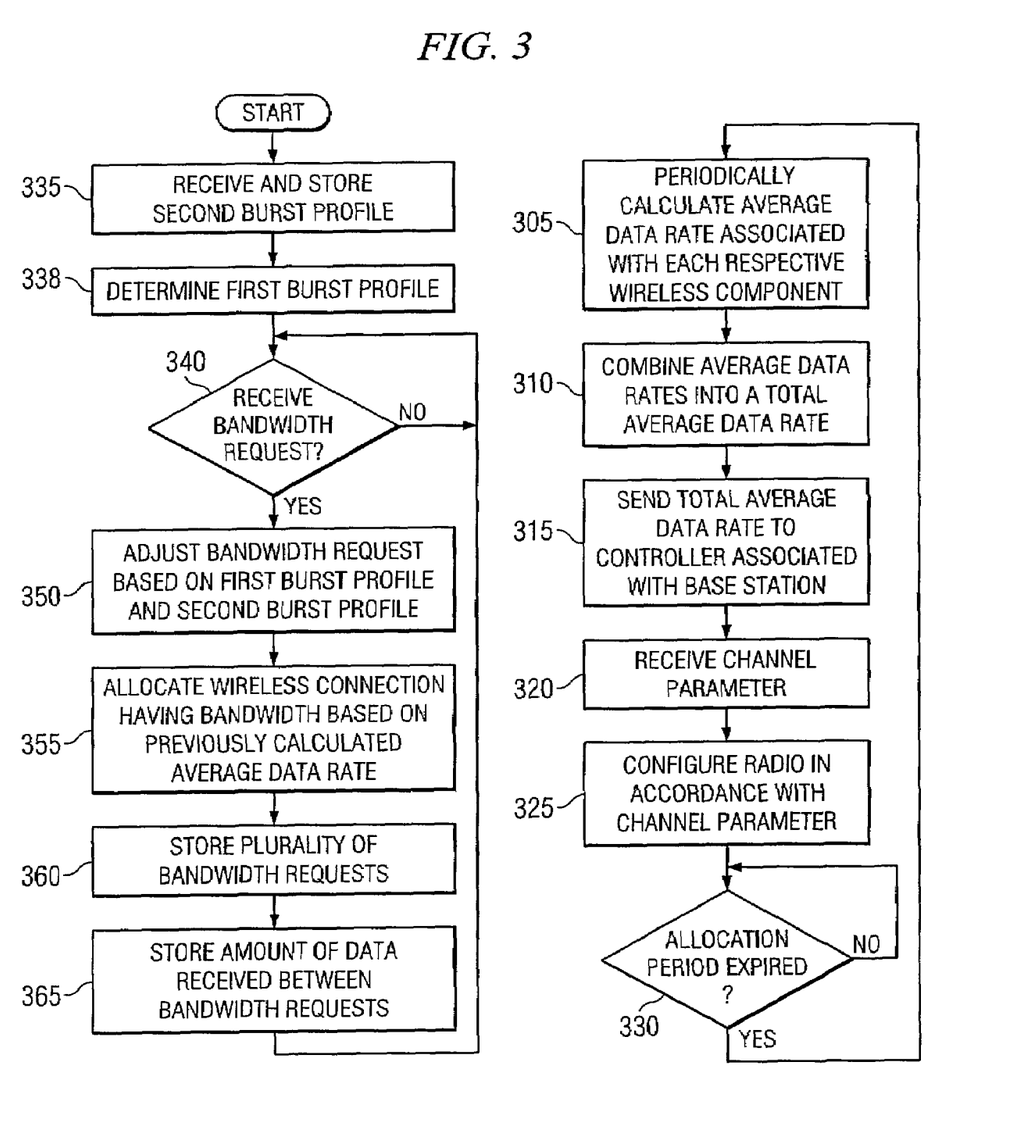
FIG. 3 illustrates a method for assigning channels in a wireless network, in accordance with a particular embodiment.

FIG. 3 illustrates a method for assigning channels in a wireless network, in accordance with a particular embodiment. The illustrated method allows, among other things, for the bandwidth of a wireless connection to be set based on an average data rate as opposed to the most recent bandwidth request. The method also allows, among other things, for a relay station to reduce the number of communications sent to a base station by sending the total average data rate for its various wireless connections on a periodic basis. For purposes of illustrating the depicted flowcharts it will be assumed that there are two wireless components connected to one relay station that is connected to one base station. The steps are assumed to occur primarily within the relay station, though in other embodiments these steps may occur within the base station. FIG. 3 comprises two flows. Steps 305 through 330 are repeated on a periodic basis; steps 335 and 338 may be performed aperiodically and independently of the receipt of bandwidth requests; and steps 340 through 365 may be performed aperiodically as bandwidth requests are received.

The first of the six periodic steps depicted in FIG. 3 is step 305 in which the relay station periodically calculates the average data rate associated with both of the two wireless components. The average data rate for each wireless component may be calculated using equation (1) discussed above with respect to FIG. 2. The average data rate represents data sent over a statistically longer period of time as opposed to simple bandwidth requests which may only represent what the wireless component currently has to send. The data used in calculating the average data rate may be collected and processed in steps 340 through 365.

At step 310 the average data rates for both wireless components may be combined into one total average data rate. This may involve adding the average data rates for both wireless components to each other. It should be noted that while the total average data rate may be the sum of the average data rates, the two individual average data rates are still retained so that they may be used in allocating bandwidth to a wireless connection as discussed below with respect to step 355.

The total average data rate may provide a convenient format for the relay station to inform the controller as to the amount of data being transmitted by the two wireless components. Accordingly, at step 315 the relay station sends the total average data rate to a controller associated with the base station. This may involve sending the total average data rate to the base station via a wireless connection. The base station may then pass the average data rate to the controller which may then use the average data rate from the relay station as well as the average data rate from the base station to determine channel parameters for the channels used by the relay station and the base station. The controller may determine the size of the channel to be allocated to each relay station and base station by using equation (3) above. In those embodiments that comprise more than one relay station or base station, the controller may utilize the average data from these components as well in determining how to allocate channels.

After the relay station sends its average data rate, it receives the channel parameter determined by the controller at step 320. At step 325 the relay station may use the received channel parameter in configuring one of its radios so that it is able to communicate with the base station using the determined channel parameter. After configuring the radio the relay station may wait at step 330 for the allocation period to expire. The amount of time the relay station may wait at step 330 may depend on the length of the allocation period used by the relay station and the amount of delay experienced in performing steps 305 through 325.

As mentioned above, steps 335 and 338 may be performed aperiodically and independently of the receipt of bandwidth requests. Depending on the embodiment, the base station may send the relay station a second burst profile when the relay station and base station first recognize each other or each time the base station sends data to the relay station. Similarly, depending on the embodiment, the relay station may send the wireless component a first burst profile when the relay station and wireless component first recognize each other or each time the relay station sends data to the wireless component. One way the base station and relay station may send the respective burst profiles may be by including it in the beginning of each frame they send. The first burst profile provides a way for the relay station to inform the wireless component of how the two devices will encode and/or modulate the data they send/receive. Similarly, the second burst profile provides a way for the base station to inform the relay station of how the two devices will encode and/or modulate the data they send/receive. Because these burst profiles may be different they may affect the efficiency with which data is sent/received.

At any point during any allocation period (steps 305 through 330), the relay station may receive a bandwidth request from either or both wireless components. Upon receiving the bandwidth request the relay station may begin to proceed through steps 340 through 365. At step 340 the bandwidth request is received. The bandwidth request may be similar to a standard bandwidth request used in typical WiMAX networks. More specifically, the fact that the relay station will calculate an average data rate does not change the format of the bandwidth request sent by the wireless component. The wireless component may send the bandwidth request whenever it has data that it wants to send (e.g., upload a file, request a webpage).

At step 350 the relay station adjusts the bandwidth request based on the first burst profile and the second burst profile. The adjustment accounts for any differences in efficiency caused by the way data sent between the relay station and the wireless component, and between the base station and the relay station is encoded and/or modulated. The adjustment may be done using equation (2) discussed above with respect to FIG. 2.

Steps 355 and 360 may be performed approximately at the same time, or their order may be switched depending on the embodiment. At step 355 the relay station allocates to the wireless component a wireless connection having a bandwidth based on the most recently calculated average data rate (step 305). At step 360 the relay station stores the bandwidth request to be used in a subsequent calculation of the average data rate.

Once the wireless component has been allocated its bandwidth it may begin to send data to the relay station using the allocated bandwidth of its wireless connection. The relay station may in turn send the data to the base station using the channel determined by the controller. While the relay station is receiving data from the wireless component, it may be tracking the amount of data that has been received. At step 365 the amount of data that is sent by the wireless component is stored. This data is also used in determining the average data rate at step 305. Then the method returns to step 340 where the relay station either waits to receive another bandwidth request or, if it has received another bandwidth request, proceeds through steps 340 through 365.

Some of the steps illustrated in FIG. 3 may be combined, modified or deleted where appropriate, and additional steps may also be added to the flowchart. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of the present invention. For example, although an embodiment has been described with reference to a number of elements included within communication system 100 and illustrated endpoints, base station an relay stations, these elements may be combined, rearranged or positioned in order to accommodate particular routing architectures or needs. In addition, any of these elements may be provided as separate external components to communication system 100 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for assigning channels in a wireless network, comprising:
receiving from each of a plurality of a first type of wireless components a total average data rate, the total average data rate received from a particular one of the first type of wireless components being based on an average data rate for each of a first plurality of a second type of wireless components coupled to the particular one of the first type of wireless components from which the total average data rate is received;
determining at least one channel parameter for a first wireless component of the plurality of the first type of wireless components based on a ratio of the total average data rate received from the first wireless component to the sum of the total average data rate received from the plurality of the first type of wireless components; and
allocating a channel to the first wireless component based on the determined at least one channel parameter.

2. The method of claim 1, further comprising:
receiving a plurality of bandwidth requests from a second plurality of the second type of wireless components;
storing the plurality of bandwidth requests;
storing the amount of data received between each bandwidth request of the plurality of bandwidth requests from each respective second type of wireless component;
periodically calculating the average data rate for each of the second plurality of the second type of wireless components, the average data rate for each of the second plurality of the second type of wireless components based on at least two prior bandwidth requests received from the second type of wireless component and the amount of data received between the at least two prior bandwidth requests;
upon calculating the average data rate for each of the second plurality of the second type of wireless components, determining a total average data rate comprising the average data rate for each of the second plurality of the second type of wireless components; and
upon receiving a first bandwidth request from a second wireless component of the second plurality of the second type of wireless components, allocating to the second wireless component a wireless connection having a bandwidth based on a previously calculated average data rate for the second wireless component.

3. The method of claim 1, wherein:
the first type of wireless component comprises a relay station; and
the second type of wireless component comprises an endpoint.

4. The method of claim 1, wherein the at least one channel parameter comprises a center frequency.

5. The method of claim 1, wherein the at least one channel parameter comprises a channel size.

6. The method of claim 1, wherein said determining at least one channel parameter for the first wireless component of the plurality of the first type of wireless components comprises determining at least one channel parameter for each radio of a plurality of radios associated with the first wireless component.

7. The method of claim 1, wherein the first type of wireless component and the second type of wireless component use 802.16 Worldwide Interoperability for Microwave Access (WiMAX).

8. The method of claim 1, further comprising adjusting C(R") so that C(R") is a channel size selected from the group consisting of: 1.25 MHz, 5 MHz, 10 MHz, 20 MHz, and 40 MHz.

9. The method of claim 1,
further comprising receiving a remote channel parameter associated with a remote plurality of the first type of wireless components; and
wherein the at least one channel parameter for each of the first type of wireless components is further determined using the remote channel parameter.

10. A method for assigning channels in a wireless network, comprising:
receiving a plurality of bandwidth requests from a plurality of wireless components;
storing the plurality of bandwidth requests;
for each of the wireless components, storing the amount of data received between each bandwidth request received from the wireless component; and
for each of the wireless components, periodically calculating an average data rate associated with the wireless component, the average data rate based on at least two prior bandwidth requests received from the wireless component and the amount of data received from the wireless component between the at least two prior bandwidth requests.

11. The method of claim 10, further comprising:
upon calculating the average data rate associated with each wireless component, sending the average data rate associated with each wireless component to a controller associated with a base station; and
receiving at least one channel parameter, the at least one channel parameter determined by the controller associated with the base station and used to communicate data with the base station.

12. The method of claim 11:
further comprising combining the average data rate associated with each wireless component into a total average data rate; and
wherein sending the average data rate associated with each wireless component to the controller associated with the base station comprises sending the total average data rate to the controller associated with the base station.

13. The method of claim 11, further comprising configuring at least one radio in accordance with the at least one channel parameter.

14. The method of claim 10, further comprising upon receiving a first bandwidth request from a first wireless component of the plurality of wireless components, allocating to the first wireless component a wireless connection having a bandwidth based on a previously calculated average data rate associated with the first wireless component.

15. The method of claim 10, wherein the plurality of wireless components are selected from a group consisting of: a wireless base station, a wireless endpoint, a wireless relay station, and a radio.

16. The method of claim 10, wherein the plurality of wireless components use 802.16 Worldwide Interoperability for Microwave Access (WiMAX).

17. The method of claim 10, further comprising:
determining a first burst profile for each wireless component of the plurality of wireless components;
receiving a second burst profile from the base station; and
adjusting each bandwidth request of the plurality of bandwidth requests by multiplying each respective bandwidth request by the respective first burst profile divided by the second burst profile.

18. A system for assigning channels in a wireless network, comprising:
a memory comprising code;
an interface operable to receive from each of a plurality of a first type of wireless components a total average data rate, the total average data rate received from a particular one of the first type of wireless components being based on an average data rate for each of a first plurality of a second type of wireless components coupled to the particular one of the first type of wireless components from which the total average data rate is received; and
a processor coupled to the interface and the memory and operable to execute the code to:
determine at least one channel parameter for a first wireless component of the plurality of the first type of wireless components based on a ratio of the total average data rate received from the first wireless component to the sum of the total average data rate received from the plurality of the first type of wireless components; and
allocate a channel to the first wireless component based on the determined at least one channel parameter.

19. The system of claim 18, wherein:
the interface is further operable to receive a plurality of bandwidth requests from a second plurality of the second type of wireless components;
the processor is further operable to:
store the plurality of bandwidth requests;
store the amount of data received between each bandwidth request of the plurality of bandwidth requests from each respective second type of wireless component;
periodically calculate the average data rate for each of the second plurality of the second type of wireless components, the average data rate for each of the second plurality of the second type of wireless components based on at least two prior bandwidth requests received from the second type of wireless component and the amount of data received between the at least two prior bandwidth requests;
upon calculation of the average data rate for each of the second plurality of the second type of wireless components, determine a total average data rate comprising the average data rate for each of the second plurality of the second type of wireless components; and
upon receipt of a first bandwidth request from a second wireless component of the second plurality of the second type of wireless components, allocate to the second wireless component a wireless connection having a bandwidth based on a previously calculated average data rate for the second wireless component.

20. The system of claim 18, wherein:
the first type of wireless component comprises a relay station; and
the second type of wireless component comprises an endpoint.

21. The system of claim 18, wherein the processor operable to determine at least one channel parameter for the first wireless component of the plurality of the first type of wireless components if further operable to determine at least one channel parameter for each radio of a plurality of radios associated with the first wireless component.

22. The system of claim 18, wherein the processor is further operable to adjust $C(R'')$ so that $C(R'')$ is a channel size selected from the group consisting of: 1.25 MHz, 5 MHz, 10 MHz, 20 MHz, and 40 MHz.

23. A system for assigning channels in a wireless network, comprising:
a memory comprising code;
an interface operable to receive a plurality of bandwidth requests from a plurality of wireless components; and
a processor coupled to the interface and the memory and operable to execute the code to:
store the plurality of bandwidth requests;
for each of the wireless components, store the amount of data received between each bandwidth request received from the wireless component; and
for each of the wireless components, periodically calculate an average data rate associated with the wireless component, the average data rate based on at least two prior bandwidth requests received from the wireless component and the amount of data received from the wireless component between the at least two prior bandwidth requests.

24. The system of claim 23, wherein the interface is further operable to:
upon calculation of the average data rate associated with each wireless component, send the average data rate associated with each wireless component to a controller associated with a base station; and
receive at least one channel parameter, the at least one channel parameter determined by the controller associated with the base station and used to communicate data with the base station.

25. The system of claim 24:
wherein the processor is further operable to combine the average data rate associated with each wireless component into a total average data rate; and
wherein the interface operable to send the average data rate associated with each wireless component to the controller associated with the base station is further operable to send the total average data rate to the controller associated with the base station.

26. The system of claim 24, wherein:
the interface is further operable to receive the at least one channel parameter from the controller associated with the base station; and
the processor is further operable to configure at least one radio in accordance with the at least one channel parameter.

27. The system of claim 23, wherein the processor is further operable to, upon receipt of a first bandwidth request from a first wireless component of the plurality of wireless components, allocate to the first wireless component a wireless connection having a bandwidth based on a previously calculated average data rate associated with the first wireless component.

28. Logic embodied in a computer readable medium, the computer readable medium comprising code operable when executed by a computer to:
- receive from each of a plurality of a first type of wireless components a total average data rate, the total average data rate received from a particular one of the first type of wireless components being based on an average data rate for each of a first plurality of a second type of wireless components coupled to the particular one of the first type of wireless components from which the total average data rate is received;
- determine at least one channel parameter for a first wireless component of the plurality of the first type of wireless components based on a ratio of the total average data rate received from the first wireless component to the sum of the total average data rate received from the plurality of the first type of wireless components; and
- allocate a channel to the first wireless component based on the determined at least one channel parameter.

29. Logic embodied in a computer readable medium, the computer readable medium comprising code operable when executed by a computer to:
- receive a plurality of bandwidth requests from a plurality of wireless components;
- store the plurality of bandwidth requests;
- for each of the wireless components, store the amount of data received between each bandwidth request received from the wireless component; and
- for each of the wireless components, periodically calculate an average data rate associated with the wireless component, the average data rate based on at least two prior bandwidth requests received from the wireless component and the amount of data received from the wireless component between the at least two prior bandwidth requests.

30. A system for assigning channels in a wireless network, comprising:
- means for receiving from each of a plurality of a first type of wireless components a total average data rate, the total average data rate received from a particular one of the first type of wireless components being based on an average data rate for each of a first plurality of a second type of wireless components coupled to the particular one of the first type of wireless components from which the total average data rate is received;
- means for determining at least one channel parameter for a first wireless component of the plurality of the first type of wireless components based on a ratio of the total average data rate received from the first wireless component to the sum of the total average data rate received from the plurality of the first type of wireless components; and
- means for allocating a channel to the first wireless component based on the determined at least one channel parameter.

31. A system for assigning channels in a wireless network, comprising:
- means for receiving a plurality of bandwidth requests from a plurality of wireless components;
- means for storing the plurality of bandwidth requests;
- means for storing, for each of the wireless components, the amount of data received between each bandwidth request received from the wireless component; and
- means for periodically calculating, for each of the wireless components, an average data rate associated with the wireless component, the average data rate based on at least two prior bandwidth requests received from the wireless component and the amount of data received from the wireless component between the at least two prior bandwidth requests.

* * * * *